April 6, 1948. H. G. WHITEHOUSE 2,439,231
UNIVERSAL JOINT COUPLING
Filed Nov. 4, 1944
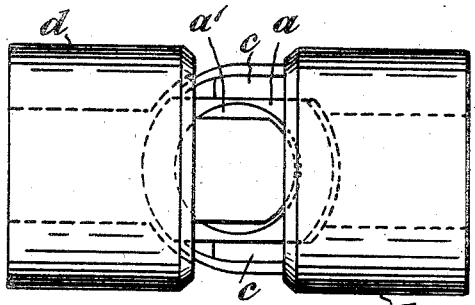
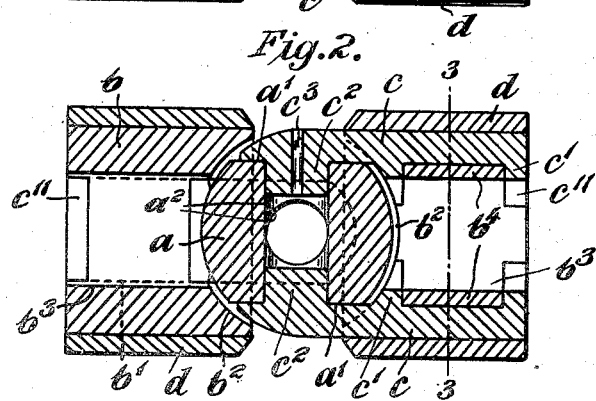
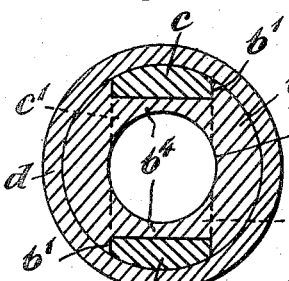
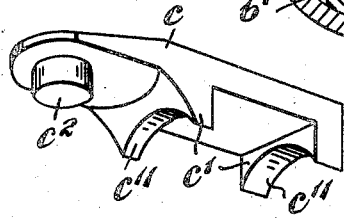
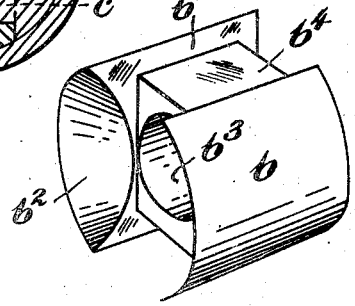
Inventor
Herbert Gurmin Whitehouse
by Marshall & Marshall
Attorneys Patented Apr. 6, 1948

2,439,231

UNITED STATES PATENT OFFICE 2,439,231

UNIVERSAL JOINT COUPLING

Herbert Gurmin Whitehouse, Tipton, England

Application November 4, 1944, Serial No. 561,865
In Great Britain February 18, 1944

1 Claim. (Cl. 64—17)

This invention has reference to improvements in universal joint couplings and is more particularly applicable to shaft or like couplings embodying a pivotal or swivelling member interposed and connected between the presented ends of the two members of the coupling to which the shafts or the like are secured.

It is known to utilise a pivotally mounted substantially spheroidal body as the interposed member and to locate and connect this body to the presented ends of the shaft or the like coupling by means of cylindrical members which are provided with trunnion mountings for the said body and thus provide a universal coupling between the two shafts or the like. The object of the present invention is to improve the means of forming the trunnioned part of the coupling and to securely locate that part within the coupling assemblage so as to avoid the use of any separate pins, screws, or like securing means in the coupling, whereby the coupling has no loose or normally separable members which might become displaced and thus destroy or impair the efficiency of the coupling.

The invention consists of a universal joint coupling for shafts and the like, characterised by the coupling comprising a plurality of interconnected units avoiding the provision of separable pin or screw connections in the coupling; said units embodying two pairs of trunnioned ear pieces adapted to be embraced and rigidly positioned within the presented end coupling members, said ear pieces incorporating the trunnions for the interposed substantially spheroidal body about which the coupling members rock.

The invention will now be described in a preferred form with particular reference to the accompanying sheet of drawings, in which:

Fig. 1 is a side elevation of the assembled coupling members.

Fig. 2 is a longitudinal sectional elevation of the members seen in Fig. 1.

Fig. 3 is a cross-sectional end elevation taken on line 3—3 of Fig. 2.

Fig. 4 is a perspective view of one of the trunnioned ear pieces.

Fig. 5 is a perspective view of the substantially cylindrical inner member which is adapted to be associated with a pair of trunnioned ear pieces.

According to the illustrated means of carrying the invention into practice as applied to a universal joint coupling for shafts, each of the end coupling members is of identical formation and has interposed between the presented ends thereof a pivotally mounted spheroidal body $a$ having four flats $a^1$ formed thereon, which is also formed with transverse through slots $a^2$ in the body diametrically extending from one flat $a^1$ to the complementary flat, thus forming a cruciform slot through the centre of the spheroidal body. The end coupling members each comprise a substantially cylindrical inner section $b$ (see Fig. 5) having two peripherally arranged parallel longitudinal slots $b^1$ formed in the side walls thereof, the presented end of each cylindrical member being formed with an arcuate seating $b^2$ to admit of the free swivelling motion of the spheroidal body $a$ within and between the presented ends. In order to complete each inner section there is provided a pair of ear pieces $c$ (see Fig. 4) which are integrally formed with a pair of inwardly directed flanges $c^1$ and a cylindrical peg or trunnion $c^2$, the flanges having arcuate faces $c^{11}$ to conform with the diameter of the bore $b^3$ of the cylindrical member $b$.

These ear pieces $c$ are adapted for location within the longitudinal slots $b^1$ formed in the periphery of the cylindrical member $b$, the flanges $c^1$ acting as locating means on either side of an integral bridge piece $b^4$ formed in the cylindrical member through which the bore longitudinally extends. The peg or trunnion $c^2$ of each ear piece $c$ engages within one end of one of the diametrical slots $a^2$ in the spheroidal body $a$. When the two ear pieces $c$ comprising a pair are positioned within a cylindrical member $b$ they serve to complete the cylindrical periphery of this member, and the extending pegged or trunnioned ends of these ears serve to partially embrace the spheroidal body $a$ as clearly seen in Fig. 2 of the drawings and complete the coupling therebetween. In order to firmly secure these ear pieces $c$ to and within the cylindrical member $b$ there is provided an embracing ring or collar $d$ which can be shrunk or driven or otherwise firmly secured around the cylindrical member $b$ and the contained ear pieces $c$. Thus the joint coupling is completed without the necessity for any loose or separate fixing pins, screws, or the like as is the common practice in universal joint couplings of this character.

A lubricating hole $c^3$ extends through one of the trunnion pins $c^2$ to provide a means of supplying lubricating oil to the bearing surfaces of the coupling.

It will be appreciated that the aforesaid coupling members when assembled are connected in known manner to the ends of the shafts or the like to be interconnected.

I claim:

A universal joint coupling for shafts and the like, comprising a pair of coupling members each having two longitudinal slots on opposite sides thereof and having a central bridge portion, a pair of brackets fitting in the slots of each coupling member to maintain them in longitudinal alignment with the coupling member, a pair of depending flanges integral with each bracket and spanning the bridge portion of each coupling member to prevent longitudinal movement of the brackets relative to the coupling member, a retaining collar holding the brackets in engagement with each coupling member, a longitudinal extension integral with each bracket, and a central member to which the extensions of the two pairs of brackets are trunnioned on two transverse axes.

HERBERT GURMIN WHITEHOUSE.

REFERENCES CITED

The following references are of record in the file of this patent:

UNITED STATES PATENTS

| Number | Name | Date |
|---|---|---|
| 634,540 | Prior | Oct. 10, 1899 |
| 950,094 | Cummings | Feb. 22, 1910 |
| 1,700,991 | Wintercorn | Feb. 5, 1929 |
| 1,897,945 | Dooley | Feb. 14, 1933 |

FOREIGN PATENTS

| Number | Country | Date |
|---|---|---|
| 352,691 | Germany | 1922 |